(12) United States Patent
Choi et al.

(10) Patent No.: US 9,334,401 B2
(45) Date of Patent: May 10, 2016

(54) THERMOPLASTIC RESIN COMPOSITION AND MOLDED ARTICLE INCLUDING THE SAME

(71) Applicant: Cheil Industries Inc., Gumi-si (KR)

(72) Inventors: Dong Kil Choi, Uiwang-si (KR); Pil Ho Kim, Uiwang-si (KR); Seung Shik Shin, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/250,531

(22) Filed: Apr. 11, 2014

(65) Prior Publication Data

US 2014/0323642 A1    Oct. 30, 2014

(30) Foreign Application Priority Data

Apr. 26, 2013   (KR) .................. 10-2013-0046949

(51) Int. Cl.
   C08L 55/02     (2006.01)
   C08L 69/00     (2006.01)

(52) U.S. Cl.
   CPC ............. *C08L 69/00* (2013.01); *C08L 2205/03* (2013.01)

(58) Field of Classification Search
   CPC ..................................................... C08L 55/02
   USPC ......................................... 524/521; 525/185
   See application file for complete search history.

(56) References Cited

U.S. PATENT DOCUMENTS

| 4,963,618 | A | 10/1990 | Sasaki et al. |
| 7,534,832 | B2 | 5/2009 | Ahn et al. |
| 7,544,745 | B2 | 6/2009 | Ma et al. |
| 7,803,461 | B2 | 9/2010 | Lee et al. |
| 8,048,524 | B2 | 11/2011 | Ahn et al. |
| 2006/0252883 | A1 | 11/2006 | Berzinis et al. |
| 2009/0023871 | A9* | 1/2009 | Fujiguchi et al. ............. 525/464 |
| 2009/0156719 | A1 | 6/2009 | Jin et al. |
| 2009/0326111 | A1 | 12/2009 | Rogunova |
| 2014/0093682 | A1 | 4/2014 | Nakamoto et al. |

FOREIGN PATENT DOCUMENTS

| CN | 1860170 A | 11/2006 |
| CN | 1902233 A | 1/2007 |
| CN | 101506300 A | 8/2009 |
| EP | 0299468 A2 | 1/1989 |
| JP | 2006-249163 A | 9/2006 |
| KR | 10-2007-0052820 A | 5/2007 |
| KR | 10-2008-0063229 A | 7/2008 |
| KR | 10-2011-0028467 A1 | 3/2011 |
| WO | 2004/058839 A1 | 7/2004 |
| WO | 2012/169631 A1 | 12/2012 |

OTHER PUBLICATIONS

European Search Report in counterpart European Application No. 14165823.7 dated Aug. 21, 2014, pp. 1-5.
Office Action in counterpart Korean Application No. 10-2013-0046949 dated Aug. 11, 2015, pp. 1-4.
Office Action in counterpart Chinese Application No. 201410158955.X dated Sep. 1, 2015, pp. 1-4.

* cited by examiner

*Primary Examiner* — Edward Cain

(74) *Attorney, Agent, or Firm* — Additon, Higgins & Pendleton, P.A.

(57) ABSTRACT

Disclosed herein is a thermoplastic resin composition, which includes a polycarbonate resin; and a rubber-reinforced vinyl copolymer, wherein the rubber-reinforced vinyl copolymer comprises a matrix including a branched vinyl copolymer which is a polymer of a monomer mixture including an alkyl (meth)acrylate and a reactive monomer, and a dispersed rubbery polymer in the matrix. The thermoplastic resin composition can exhibit excellent impact resistance and/or flowability.

8 Claims, No Drawings

THERMOPLASTIC RESIN COMPOSITION AND MOLDED ARTICLE INCLUDING THE SAME

CROSS-REFERENCE TO RELATED APPLICATION

This application claims priority under 35 USC Section 119 to and the benefit of Korean Patent Application No. 10-2013-0046949, filed Apr. 26, 2013, the entire disclosure of which is incorporated herein by reference.

FIELD OF THE INVENTION

The present invention relates to a thermoplastic resin composition and a molded article including the same.

BACKGROUND

Polycarbonate (PC) compositions prepared by melt-mixing PC with heat stabilizers, antioxidants, plasticizers, impact modifiers, flame retardants, organic fillers and the like are widely used as an engineering plastic. Such polycarbonate compositions can exhibit excellent properties as compared with general purpose resins, such as polystyrene, polyethylene, polyvinyl chloride, polypropylene resins, and the like. In particular, since the polycarbonate compositions can allow easy adjustment of properties, such as impact resistance, flame retardancy, flowability and the like, the polycarbonate compositions are widely applied to a variety of fields including electronics, such as mobile phones, televisions, office machines and the like, industrial components, and miscellaneous goods.

Melt-mixing the PC with an acrylonitrile-butadiene-styrene (ABS) resin is widely used as to adjust the properties of the PC compound. Here, the properties suitable for each purpose can be secured through modification of mixing ratio, composition ratio, molecular weight and the like in the ABS resin.

Recently, for environmentally friendly design of plastic products, products having lighter-weight and thinner thickness are developed. Thus, there is an increasing need for novel PC compositions (thermoplastic resin compositions) simultaneously exhibiting various properties which are difficult to realize in an existing typical PC composition.

Korean Patent Publication No. 10-2008-0063229 discloses a system in which impact resistance is reinforced through application of a cross-linked rubber particle type impact modifier, such as MBS and the like, in addition to ABS, and flame retardancy and flowability are reinforced through application of a phosphorus flame retardant. However, in such a system, an excess of the phosphorus flame retardant is used to realize high flowability, thereby causing deterioration in heat resistance.

Korean Patent Publication No. 10-2007-0052820 discloses a resin composition having improved flowability through application of a PC oligomer. However, since such a PC oligomer has a relatively low weight average molecular weight ranging from about 3,000 g/mol to about 6,000 g/mol, the composition can suffer significant deterioration in impact resistance and elongation, despite improved flowability.

Therefore, there is a need for a thermoplastic resin composition exhibiting excellent impact resistance and flowability without deterioration in other properties.

SUMMARY

Exemplary embodiments of the present invention relate to a thermoplastic resin composition, which can be environmentally friendly and can exhibit excellent impact resistance, flowability and/or flame retardancy through application of a specific rubber-reinforced vinyl copolymer resin, and a molded article including the composition.

The thermoplastic resin composition includes: a polycarbonate resin; and a rubber-reinforced vinyl copolymer, wherein the rubber-reinforced vinyl copolymer comprises a matrix including a branched vinyl copolymer which is a polymer of a monomer mixture including an alkyl (meth)acrylate and a reactive monomer, and a dispersed rubbery polymer in the matrix.

In one embodiment, the rubber-reinforced vinyl copolymer may comprise a matrix including a branched vinyl copolymer obtained by copolymerization of a monomer mixture including an aromatic vinyl compound, a vinyl cyanide compound, the alkyl (meth)acrylate and the reactive monomer, and a dispersed rubbery polymer in the matrix.

In one embodiment, the rubber-reinforced vinyl copolymer may be obtained by dispersing about 1% by weight (wt %) to about 20 wt % of the rubbery polymer in the matrix including the branched vinyl copolymer, which is obtained by copolymerization of the monomer mixture including about 40 wt % to about 90 wt % of the aromatic vinyl compound, about 5 wt % to about 50 wt % of the vinyl cyanide compound, about 1 wt % to about 20 wt % of the alkyl (meth)acrylate, and about 0.1 wt % to about 10 wt % of the reactive monomer, based on 100 wt % of the rubber-reinforced vinyl copolymer.

In one embodiment, the alkyl (meth)acrylate may include at least one of ethyl acrylate, propyl acrylate, butyl acrylate, and hexyl acrylate.

In one embodiment, the reactive monomer may include at least one of polydimethylsiloxane-methylvinylsiloxane, hexanediol diacrylate, trimethylolpropane triacrylate, and pentaerythritol tetraacrylate.

In one embodiment, the thermoplastic resin composition may include about 60 wt % to about 95 wt % of the polycarbonate resin, and about 5 wt % to about 40 wt % of the rubber-reinforced vinyl copolymer.

In one embodiment, the thermoplastic resin composition may further include a flame retardant.

In one embodiment, the thermoplastic resin composition may have an Izod impact strength from about 20 kgf·cm/cm to about 70 kgf·cm/cm, as measured on an about ⅛" thick specimen in accordance with ASTM D638.

In one embodiment, the thermoplastic resin composition may have a melt index from about 20 g/10 min to about 60 g/10 min, as measured under conditions of about 220° C. and about 10 kgf in accordance with ASTM D1238.

Other exemplary embodiments of the present invention relate to a molded article produced from the thermoplastic resin composition.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to one embodiment of the invention includes: (A) a polycarbonate resin; and (B) a rubber-reinforced vinyl copolymer, wherein the rubber-reinforced vinyl copolymer comprises a matrix including a branched vinyl copolymer which is a polymer of a monomer mixture including an alkyl (meth)acrylate and a reactive monomer, and a dispersed rubbery polymer in the matrix.

Unless otherwise stated, the term "(meth)acryl" as used herein may refer to acryl and/or methacryl. For example, "(meth)acrylate" may refer to acrylate and/or methacrylate.

(A) Polycarbonate Resin

The polycarbonate resin may be a polycarbonate resin known in the art, and may be prepared using a typical method. For example, the polycarbonate resin may be prepared by reacting a dihydric phenol compound with phosgene in the presence of a molecular weight regulator and a catalyst. In another embodiment, the polycarbonate resin may also be prepared through transesterification of a dihydric phenol compound and a carbonate precursor such as diphenyl carbonate.

In the preparation of the polycarbonate resin, the dihydric phenol compound may be a bisphenol compound, for example, 2,2-bis(4-hydroxyphenyl)propane ("bisphenol A"). Here, the bisphenol A may be partially or fully replaced by other dihydric phenol compounds. Examples of the other dihydric phenol compounds may include without limitation hydroquinone, 4,4'-biphenol, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, halogenated bisphenols such as bis(4-hydroxyphenyl)ether and 2,2-bis(3,5-dibromo-4-hydroxyphenyl)propane, and the like, and mixtures thereof. However, the dihydric phenol compound which can be used for preparation of the polycarbonate resin is not limited thereto, and the polycarbonate resin may be prepared using any dihydric phenol compound.

Examples of the polycarbonate resin may include without limitation homopolymers using one dihydric phenol compound, copolymers using at least two dihydric phenol compounds, and mixtures thereof.

Examples of the polycarbonate resin included in the thermoplastic resin composition may include linear polycarbonate resins, branched polycarbonate resins, polyester carbonate copolymer resins, and the like, and mixtures thereof, without being limited thereto.

For example, the linear polycarbonate resin may be a bisphenol A polycarbonate resin, and the branched polycarbonate resin may be prepared by, for example, reacting a polyfunctional aromatic compound, such as trimellitic anhydride, trimellitic acid and the like, with a dihydric phenol compound and a carbonate precursor. In addition, the polyester carbonate copolymer resin may be prepared by, for example, reacting a bifunctional carboxylic acid with dihydric phenol and a carbonate precursor. In addition to the above materials, the polycarbonate resin may include typical linear polycarbonate resins, branched polycarbonate resins, and/or polyester carbonate copolymer resins.

The (A) polycarbonate resin may have a weight average molecular weight from about 5,000 g/mol to about 500,000 g/mol, without being limited thereto. As the (A) polycarbonate resin, the above materials may be used alone, or the above materials having different molecular weights may be used in combination thereof.

The thermoplastic resin composition may include the polycarbonate resin in an amount of about 60 wt % to about 95 wt %, for example, about 65 wt % to about 90 wt %, based on the total weight (100 wt %) of the thermoplastic resin composition. In some embodiments, the thermoplastic resin composition may include the polycarbonate resin in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the polycarbonate resin can be in a range from about any of the foregoing amounts to about any other of the foregoing amounts.

When the thermoplastic resin composition includes the polycarbonate resin in an amount within this range, the thermoplastic resin composition can exhibit excellent properties in terms of impact resistance, flowability, property balance therebetween, and the like.

(B) Rubber-Reinforced Vinyl Copolymer

The rubber-reinforced vinyl copolymer comprises a matrix including a branched vinyl copolymer which is a polymer of a monomer mixture including an alkyl (meth)acrylate and a reactive monomer, and a dispersed rubbery polymer in the matrix. The rubber-reinforced vinyl copolymer has a structure in which a rubbery polymer is dispersed in a matrix including a branched vinyl copolymer corresponding to a polymer of a monomer mixture including an alkyl (meth)acrylate and a reactive monomer.

In one embodiment, the matrix including a branched vinyl copolymer may be obtained by copolymerization of a monomer mixture including an aromatic vinyl compound, a vinyl cyanide compound, an alkyl (meth)acrylate, and a reactive monomer.

Examples of the aromatic vinyl compound may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like. These may be used alone or in combination thereof. In exemplary embodiments, the aromatic vinyl compound may be styrene.

The rubber-reinforced vinyl copolymer may include the aromatic vinyl compound in an amount of about 40 wt % to about 90 wt %, for example, about 45 wt % to about 85 wt %, based on the total weight (100 wt %) of the rubber-reinforced vinyl copolymer. In some embodiments, the rubber-reinforced vinyl copolymer may include the aromatic vinyl compound in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl compound can be in a range from about any of the foregoing amounts to about any other of the foregoing amounts.

When the rubber-reinforced vinyl copolymer includes the aromatic vinyl compound in an amount within this range, the thermoplastic resin composition can exhibit excellent properties in terms of impact resistance, flowability, property balance therebetween, and the like.

Examples of the vinyl cyanide compound may include without limitation acrylonitrile, methacrylonitrile, ethacrylonitrile, and the like. These may be used alone or in combination thereof. In exemplary embodiments, the vinyl cyanide compound may be acrylonitrile.

The rubber-reinforced vinyl copolymer may include the vinyl cyanide compound in an amount of about 5 wt % to about 50 wt %, for example, about 10 wt % to about 45 wt %, based on the total weight (100 wt %) of the rubber-reinforced vinyl copolymer. In some embodiments, the rubber-reinforced vinyl copolymer may include the vinyl cyanide compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the vinyl cyanide compound can be in a range from about any of the foregoing amounts to about any other of the foregoing amounts.

When the rubber-reinforced vinyl copolymer includes the vinyl cyanide compound in an amount within this range, the thermoplastic resin composition can exhibit excellent properties in terms of impact resistance, flowability, property balance therebetween, and the like.

The alkyl (meth)acrylate serves to improve flowability and impact resistance of the thermoplastic resin composition, and may be, for example, a $C_2$ to $C_{12}$ alkyl (meth)acrylate. Examples of the alkyl (meth)acrylate may include without limitation ethyl acrylate, propyl acrylate, butyl acrylate, hexyl acrylate, and the like, and mixtures thereof. In exemplary embodiments, the alkyl (meth)acrylate can include butyl (meth)acrylate.

The rubber-reinforced vinyl copolymer may include the alkyl (meth)acrylate in an amount of about 1 wt % to about 20 wt %, for example, about 5 wt % to about 18 wt %, based on the total weight (100 wt %) of the rubber-reinforced vinyl copolymer. In some embodiments, the rubber-reinforced vinyl copolymer may include the alkyl (meth)acrylate in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the alkyl (meth)acrylate can be in a range from about any of the foregoing amounts to about any other of the foregoing amounts.

When the rubber-reinforced vinyl copolymer includes the alkyl (meth)acrylate in an amount within this range, the thermoplastic resin composition can exhibit excellent properties in terms of impact resistance, flowability, property balance therebetween, and the like.

The reactive monomer may be copolymerized with the aromatic vinyl compound, the vinyl cyanide compound, and the alkyl (meth)acrylate, thereby forming the branched vinyl copolymer in the matrix. In this way, since some of the vinyl copolymer present in the matrix is in a branched form, there can be an advantage of improvement in flowability of the composition.

Examples of the reactive monomer may include without limitation polydimethylsiloxane-methylvinylsiloxane, hexanediol diacrylate, trimethylolpropane triacrylate, pentaerythritol tetraacrylate, and the like, and mixtures thereof.

The rubber-reinforced vinyl copolymer may include the reactive monomer in an amount of about 0.1 wt % to about 10 wt %, for example, about 0.5 wt % to about 5 wt %, based on the total weight (100 wt %) of the rubber-reinforced vinyl copolymer. In some embodiments, the rubber-reinforced vinyl copolymer may include the reactive monomer in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the reactive monomer can be in a range from about any of the foregoing amounts to about any other of the foregoing amounts.

When the rubber-reinforced vinyl copolymer includes the reactive monomer in an amount within this range, the thermoplastic resin composition can exhibit excellent properties in terms of impact resistance, flowability, property balance therebetween, and the like.

The rubbery polymer is dispersed in the matrix including the branched vinyl copolymer. Examples of the rubbery polymer may include without limitation: diene rubbers such as polybutadiene, poly(styrene-butadiene), poly(acrylonitrile-butadiene) and the like; saturated rubbers obtained by adding hydrogen to the diene rubber; isoprene rubbers; acrylic rubbers such as polybutyl acrylate and the like; ethylene-propylene-diene monomer terpolymers (EPDM), and the like, and mixtures thereof. In exemplary embodiments, the rubbery polymer can include a diene rubber, for example polybutadiene rubber.

The rubbery polymer may have an average particle diameter from about 0.1 μm to about 1 μm, for example, from about 0.4 μm to about 0.9 μm. Within this range, the rubbery polymer can more effectively improve impact resistance of the composition.

The rubber-reinforced vinyl copolymer may include the rubbery polymer in an amount of about 1 wt % to about 20 wt %, for example, about 3 wt % to about 15 wt %, based on the total weight of the rubber-reinforced vinyl copolymer. In some embodiments, the rubber-reinforced vinyl copolymer may include the rubbery polymer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the rubbery polymer can be in a range from about any of the foregoing amounts to about any other of the foregoing amounts.

When the rubber-reinforced vinyl copolymer includes the rubbery polymer in an amount within this range, the thermoplastic resin composition can exhibit excellent properties in terms of impact resistance, flowability, property balance therebetween, and the like.

In one embodiment, the rubber-reinforced vinyl copolymer may be prepared by typical polymerization, for example, bulk polymerization, emulsion polymerization or suspension polymerization. In exemplary embodiments, the rubber-reinforced vinyl copolymer can be prepared by suspension polymerization. For example, a mixed reaction liquid can be prepared by adding a polymerization initiator and a chain-transfer agent to a mixture including the rubbery polymer, the aromatic vinyl compound, the vinyl cyanide compound, the alkyl (meth)acrylate and the reactive monomer, which are present in amounts within the above ranges, respectively, followed by suspension polymerization by introducing the mixed reaction liquid into an aqueous solution including a suspension stabilizer and the like dissolved therein. Polymerization temperature and polymerization time may be appropriately adjusted. For example, polymerization may be performed at about 65° C. to about 125° C., for example at about 70° C. to about 120° C., for about 2 hours to about 8 hours.

The polymerization initiator may be a typical radical polymerization initiator known in the art. Examples of the polymerization initiator may include without limitation octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, azobis-(2,4-dimethyl)-valeronitrile, and the like. These may be used alone or in combination thereof. The polymerization initiator may be present in an amount of about 0.01 parts by weight to about 10 parts by weight, for example, about 0.03 parts by weight to about 5 parts by weight, based on about 100 parts by weight of the mixture including the rubbery polymer, the aromatic vinyl compound, the vinyl cyanide compound, the alkyl (meth)acrylate and the reactive monomer.

The chain-transfer agent may be used to adjust the weight average molecular weight of the rubber-reinforced vinyl copolymer and to improve heat stability thereof. The weight average molecular weight may also be adjusted by the amount of the polymerization initiator included in the monomer mixture. However, if polymerization is stopped by the chain-transfer agent, an end of a chain has a second carbon structure. The end of the chain having the second carbon structure can have stronger bonding strength than an end of a chain having a double-bond created when the chain-transfer agent is not used. Thus, addition of the chain-transfer agent can improve heat stability of the rubber-reinforced vinyl copolymer.

The chain-transfer agent may be a typical chain-transfer agent known in the art. Examples of the chain-transfer agent may include without limitation alkyl mercaptans in the form of $CH_3(CH_2)_nSH$ (where n is an integer from 1 to 20) including n-butyl mercaptan, n-octyl mercaptan, n-dodecyl mercaptan, t-dodecyl mercaptan, isopropyl mercaptan, n-amyl mercaptan, and the like; halogenated compounds including carbon tetrachloride, and the like; and aromatic compounds including α-methylstyrene dimers and α-ethylstyrene dimers, and the like. These may be used alone or in combination thereof. The chain-transfer agent may be present in an amount of about 0.01 parts by weight to about 10 parts by weight, for example, about 0.02 parts by weight to about 5 parts by weight, based on about 100 parts by weight of the mixture including the rubbery polymer, the aromatic vinyl compound, the vinyl cyanide compound, the alkyl (meth) acrylate and the reactive monomer. Within this range, the rubber-reinforced vinyl copolymer can have heat stability and appropriate molecular weight.

In addition, the rubber-reinforced vinyl copolymer may be polymerized by introducing the mixed reaction liquid into an aqueous solution including at least one or more additives. Examples of the additives can include without limitation suspension stabilizers, suspension stabilization aids, antioxidants, and the like, and mixtures thereof. The additive may be present in an amount of about 0.001 parts by weight to about 20 parts by weight, based on about 100 parts by weight of the mixture including the rubbery polymer, the aromatic vinyl compound, the vinyl cyanide compound, the alkyl (meth) acrylate and the reactive monomer, without being limited thereto.

Examples of the suspension stabilizer may include without limitation: organic suspension stabilizers including polyalkyl acrylate-acrylic acid, polyolefin-maleic acid, polyvinyl alcohol, cellulose, and the like; inorganic suspension stabilizers including tricalcium phosphate, and the like; and mixtures thereof.

Examples of the suspension stabilization aids may include without limitation disodium hydrogen phosphate, sodium dihydrogen phosphate and the like, and may also include sodium sulfate in order to control solubility of a water-soluble polymer or monomer. These may be used alone or in combination thereof.

Examples of the antioxidant may include without limitation octadecyl 3-(3,5-di-tert-butyl-4-hydroxyphenyl)propionate, triethylene glycol-bis-3 (3-tert-butyl-4-hydroxy-5-methylphenyl) propionate, 2,6-di-tert-butyl-4-methyl phenol, 2,2'-methylenebis(4-methyl-6-tert-butylphenol), tri (2,4-di-tert-butylphenyl)phosphite, n-octadecyl-3(3,5-di-tert-butyl-4-hydroxyphenyl)propionate, 1,3,5-tri(3,5-di-tert-butyl-4-hydroxybenzyl)isocyanurate, pentaerythritol tetrakis (3-(3,5-di-tert-butyl-4-hydroxyphenyl)propionate), distearyl thiodipropionate, dilauryl thiodipropionate, di-phenyl-isooctyl phosphite, and the like. These may be used alone or in combination thereof.

After polymerization, cooling, washing, dehydration, drying and the like can be performed, thereby providing the rubber-reinforced vinyl copolymer in particle form.

The rubber-reinforced vinyl copolymer may have a gel fraction from about 70 wt % to about 90 wt %. Within this range, the thermoplastic resin composition can exhibit optimal balance between flowability and impact resistance.

The thermoplastic resin composition may include the rubber-reinforced vinyl copolymer in an amount of about 5 wt % to about 40 wt %, for example, about 10 wt % to about 35 wt %, based on the total weight (100 wt %) of the thermoplastic resin composition. In some embodiments, the thermoplastic resin composition may include the rubber-reinforced vinyl copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the rubber-reinforced vinyl copolymer can be in a range from about any of the foregoing amounts to about any other of the foregoing amounts.

When the thermoplastic resin composition includes the rubber-reinforced vinyl copolymer in an amount within this range, the thermoplastic resin composition can exhibit excellent properties in terms of impact resistance, flowability, property balance therebetween, and the like.

The thermoplastic resin composition may further include a flame retardant in order to exhibit further improved flame retardancy.

The flame retardant may be a typical flame retardant, for example, a phosphorus flame retardant, for example, a typical phosphorus-containing flame retardant. Examples of the phosphorus flame retardant may include without limitation phosphates, phosphonates, phosphinates, phosphine oxides, phosphazenes, metallic salts thereof, and the like. The phosphorus flame retardant may be in a compound form or a polymer form, and may be in a liquid state. In addition, these may be used alone or in combination thereof.

When the flame retardant is used, the flame retardant may be present in an amount of about 1 part by weight to about 40 parts by weight, for example, about 5 parts by weight to about 30 parts by weight, based on about 100 parts by weight of the polycarbonate resin and the rubber-reinforced vinyl copolymer ((A)+(B)). Within this range, the thermoplastic resin composition can exhibit improved flame retardancy without deterioration of other properties.

The thermoplastic resin composition may further include one or more typical additives, as needed. Examples of the additives may include without limitation antioxidants, nucleating agents, surfactants, coupling agents, fillers, plasticizers, lubricants, antibacterial agents, release agents, heat stabilizers, light stabilizers, compatibilizers, inorganic additives, colorants, stabilizers, antistatic agents, pigments, dyes, flame retardants, and the like. These may be used alone or in combination thereof.

The thermoplastic resin composition can exhibit excellent impact resistance, flowability, flame retardancy, and the like. In addition, the thermoplastic resin composition may have an Izod impact strength from about 20 kgf·cm/cm to about 70 kgf·cm/cm, for example, from about 30 kgf·cm/cm to about 60 kgf·cm/cm, as measured on an about ⅛" thick specimen in accordance with ASTM D638, and a melt index (MI) from about 20 g/10 min to about 60 g/10 min, for example, from about 30 g/10 min to about 50 g/10 min, as measured under conditions of about 220° C. and about 10 kgf in accordance with ASTM D1238. Further, the thermoplastic resin composition may have a flame retardancy level of V-1 or higher, as measured on an about 3.2 mm thick specimen according to UL94.

Embodiments of the present invention include molded articles produced from the thermoplastic resin composition according to the present invention.

The thermoplastic resin composition may be prepared in pellet form by simultaneously mixing the above components and other additives, followed by melt-extrusion in an extruder. The prepared pellets may be formed into various molded articles (products) through various molding methods, such as injection molding, extrusion molding, vacuum molding, cast molding, and the like. These molding methods are well known to those skilled in the art. Since the molded articles can exhibit excellent properties in terms of impact resistance, flowability, flame retardancy and the like, the molded articles can be used in preparing housings of electronic/electric products, such as televisions, washing machines, cassette players, MP3 players, DMBs, navigation systems, mobile phones, telephones, game consoles, audio players, monitors, computers, printers, copiers and the like, as well as automobile components and exterior materials, which require such properties.

Next, the present invention will be described in more detail with reference to the following examples. It should be understood that these examples are provided for illustration only and are not to be construed in any way as limiting the present invention.

Examples

Details of components used in the following Examples and Comparative Examples are as follows:

(A) Polycarbonate Resin

Calibre 200-3 (LG-DOW Co., Ltd., weight average molecular weight: 35,000 g/mol) is used.

(B) Rubber-Reinforced Vinyl Copolymer (B1) Modified ABS-1

According to compositions as listed in Table 1, a free radical polymerization initiation system is applied to a suspension including a mixture, which includes 8 wt % of butadiene rubber latex, 58.5 wt % of styrene, 19.5 wt % of acrylonitrile, 12 wt % of butyl acrylate and 2 wt % of polydimethylsiloxane-methylvinylsiloxane as a reactive monomer, and 150 parts by weight of deionized water and 3 parts by weight of potassium oleate as a suspension stabilizer based on 100 parts by weight of the mixture, followed by copolymerization at 75° C. for 5 hours, thereby preparing a latex. Here, the free radical polymerization initiation system includes a mixed solution of 0.4 parts by weight of cumene hydroperoxide as a polymerization initiator, 0.5 parts by weight of a mercaptan chain-transfer agent, 0.4 parts by weight of glucose as a reducing agent of an oxidation-reduction catalyst, 0.01 parts by weight of an iron sulfate hydrate as an initiator catalyst, and 0.3 parts by weight of sodium pyrophosphate as an initiator catalyst ligand based on 100 parts by weight of the mixture. Next, 0.4 parts by weight of sulfuric acid is added to the prepared latex in terms of solid content, followed by coagulation, thereby preparing a final rubber-reinforced vinyl copolymer in a powder state. Next, the weight average molecular weight of the prepared rubber-reinforced vinyl copolymer is measured by GPC. Results are shown in Table 1.

(B2) Modified ABS-2

A rubber-reinforced vinyl copolymer in a powder state is prepared in the same manner as in (B1) except that 0.4 parts by weight of the mercaptan chain-transfer agent was used instead of 0.5 parts by weight thereof. Next, the weight average molecular weight of the prepared rubber-reinforced vinyl copolymer is measured by GPC. Results are shown in Table 1.

(B3) Modified ABS-3

A rubber-reinforced vinyl copolymer in a powder state is prepared in the same manner as in (B1) except that 0.3 parts by weight of the mercaptan chain-transfer agent was used instead of 0.5 parts by weight thereof. Next, the weight average molecular weight of the prepared rubber-reinforced vinyl copolymer is measured by GPC. Results are shown in Table 1.

(B4) ABS-1

According to compositions as listed in Table 1, a free radical polymerization initiation system is applied to a suspension including a mixture, which includes 8 wt % of butadiene rubber latex, 69.0 wt % of styrene and 23.0 wt % of acrylonitrile, and 150 parts by weight of deionized water and 3 parts by weight of potassium oleate as a suspension stabilizer based on 100 parts by weight of the mixture, followed by copolymerization at 75° C. for 5 hours, thereby preparing a latex. Here, the free radical polymerization initiation system includes a mixed solution of 0.4 parts by weight of cumene hydroperoxide as a polymerization initiator, 0.5 parts by weight of a mercaptan chain-transfer agent, 0.4 parts by weight of glucose as a reducing agent of an oxidation-reduction catalyst, 0.01 parts by weight of an iron sulfate hydrate as an initiator catalyst, and 0.3 parts by weight of sodium pyrophosphate as an initiator catalyst ligand based on 100 parts by weight of the mixture. Next, 0.4 parts by weight of sulfuric acid is added to the prepared latex in terms of solid content, followed by coagulation, thereby preparing a final rubber-reinforced vinyl copolymer in a powder state. Next, the weight average molecular weight of the prepared rubber-reinforced vinyl copolymer is measured by GPC. Results are shown in Table 1.

(B5) ABS-2

A rubber-reinforced vinyl copolymer in a powder state is prepared in the same manner as in (B4) that 0.2 parts by weight of the mercaptan chain-transfer agent is used instead of 0.5 parts by weight thereof. Next, the weight average molecular weight of the prepared rubber-reinforced vinyl copolymer is measured by GPC. Results are shown in Table 1.

TABLE 1

| | (B1) | (B2) | (B3) | (B4) | (B5) |
|---|---|---|---|---|---|
| Polybutadiene (wt %) | 8.0 | 8.0 | 8.0 | 8.0 | 8.0 |
| Styrene (wt %) | 58.5 | 58.5 | 58.5 | 69.0 | 69.0 |
| Acrylonitrile (wt %) | 19.5 | 19.5 | 19.5 | 23.0 | 23.0 |
| Butyl acrylate (wt %) | 12.0 | 12.0 | 12.0 | — | — |
| Reactive monomer (wt %) | 2.0 | 2.0 | 2.0 | — | — |
| Weight average molecular weight (g/mol) | 95,000 | 115,000 | 150,000 | 95,000 | 150,000 |

(C) Flame Retardant

A liquid-state phosphorus flame retardant CR-741 (DAIHACHI Co., Ltd.) is used.

Examples 1 to 3 and Comparative Examples 1 to 2

The components is added in amounts as listed in Table 2, followed by melting, kneading and extrusion, thereby preparing pellets. Here, extrusion is performed using a twin-screw extruder (L/D=36) having a diameter of 45 mm, and the prepared pellets are dried at 80° C. for 6 hours, followed by injection molding using an injection machine LGH 140N (LG Co., Ltd.), thereby preparing a specimen. The prepared specimen is evaluated as to the following properties. Results are shown in Table 2.

Property Evaluation (1) Izod impact strength (unit: kgf·cm/cm): Izod impact strength is measured on 1/8" thick and 1/4" thick notched Izod specimens in accordance with ASTM D256.

(2) Melt index (MI, unit: g/10 min): Melt index is measured under conditions of 220° C. and 10 kgf in accordance with ASTM D1238.

TABLE 2

| Item | | Example 1 | Example 2 | Example 3 | Comparative Example 1 | Comparative Example 2 |
|---|---|---|---|---|---|---|
| (A) (wt %) | | 75 | 75 | 75 | 75 | 75 |
| (B) (wt %) | (B1) | 25 | — | — | — | — |
| | (B2) | — | 25 | — | — | — |
| | (B3) | — | — | 25 | — | — |
| | (B4) | — | — | — | 25 | — |
| | (B5) | — | — | — | — | 25 |
| (C) (parts by weight) | | 25 | 25 | 25 | 25 | 25 |
| Izod impact strength | 1/8" | 45 | 47 | 48 | 38 | 39 |
| (kgf · cm/cm) | 1/4" | 17 | 19 | 20 | 10 | 13 |
| Melt index (g/10 min) | | 43 | 42 | 40 | 34 | 30 |

From Table 2, it can be seen that the thermoplastic resin compositions exemplifying the invention (Examples 1 to 3) exhibit excellent impact strength (impact resistance) and melt index (flowability).

Conversely, it can be seen that the thermoplastic resin compositions of Comparative Examples 1 to 2, which are prepared as a typical ABS and did not include the reactive monomer and the alkyl (meth)acrylate in the rubber-reinforced vinyl copolymer, exhibit deteriorated impact strength and melt index.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A thermoplastic resin composition comprising:
   a polycarbonate resin; and
   a rubber-reinforced vinyl copolymer,
   wherein the rubber-reinforced vinyl copolymer comprises a matrix including a branched vinyl copolymer which is a polymer of a monomer mixture including an aromatic vinyl compound, a vinyl cyanide compound, an alkyl (meth)acrylate and a reactive monomer, and a dispersed rubbery polymer in the matrix,
   wherein the rubber-reinforced vinyl copolymer is obtained by dispersing about 1 wt % to about 20 wt % of the rubbery polymer in the matrix including the branched vinyl copolymer obtained by copolymerization of the monomer mixture, the monomer mixture comprising about 40 wt % to about 90 wt % of the aromatic vinyl compound, about 5 wt % to about 50 wt % of the vinyl cyanide compound, about 1 wt % to about 20 wt % of the alkyl (meth)acrylate, and about 0.1 wt % to about 10 wt % of the reactive monomer, based on 100 wt % of the rubber-reinforced vinyl copolymer.

2. The thermoplastic resin composition according to claim 1, wherein the alkyl (meth)acrylate comprises ethyl acrylate, propyl acrylate, butyl acrylate, hexyl acrylate, or a mixture thereof.

3. The thermoplastic resin composition according to claim 1, wherein the reactive monomer comprises polydimethylsiloxane-methylvinylsiloxane, hexanediol diacrylate, trimethylolpropane triacrylate, pentaerythritol tetraacrylate, or a mixture thereof.

4. The thermoplastic resin composition according to claim 1, comprising: about 60 wt % to about 95 wt % of the polycarbonate resin; and about 5 wt % to about 40 wt % of the rubber-reinforced vinyl copolymer.

5. The thermoplastic resin composition according to claim 1, further comprising: a flame retardant.

6. The thermoplastic resin composition according to claim 1, wherein the thermoplastic resin composition has an Izod impact strength from about 20 kgf·cm/cm to about 70 kgf·cm/cm, as measured on an about 1/8" thick specimen in accordance with ASTM D638.

7. The thermoplastic resin composition according to claim 1, wherein the thermoplastic resin composition has a melt index from about 20 g/10 min to about 60 g/10 min, as measured under conditions of about 220° C. and about 10 kgf in accordance with ASTM D1238.

8. A molded article produced from the thermoplastic resin composition according to claim 1.

* * * * *